(12) United States Patent
Bordeianu

(10) Patent No.: US 7,527,273 B2
(45) Date of Patent: May 5, 2009

(54) LOCKING CHUCK

(75) Inventor: Eugen Bordeianu, Clemson, SC (US)

(73) Assignee: Jacobs Chuck Manufacturing Company, Clemson, SC (US)

( * ) Notice: Subject to any disclaimer, the term of this patent is extended or adjusted under 35 U.S.C. 154(b) by 436 days.

(21) Appl. No.: 11/219,058

(22) Filed: Sep. 2, 2005

(65) Prior Publication Data

US 2007/0052182 A1    Mar. 8, 2007

(51) Int. Cl.
*B23B 31/167* (2006.01)
(52) U.S. Cl. .......................... 279/62; 279/140
(58) Field of Classification Search .................. 279/60, 279/61, 62, 66, 134, 140; *B23B 31/167*
See application file for complete search history.

(56) References Cited

U.S. PATENT DOCUMENTS

| | | | | |
|---|---|---|---|---|
| 573,189 | A | 12/1896 | Vogel | 279/62 |
| 4,213,623 | A | 7/1980 | Rohm | 279/1 C |
| 4,302,021 | A | 11/1981 | Rohm | 279/60 |
| 4,395,170 | A | 7/1983 | Clarey | 408/241 |
| 4,498,682 | A | 2/1985 | Glore | 279/81 |
| 4,583,751 | A | 4/1986 | Rohm | 279/1 K |
| 4,840,387 | A | 6/1989 | McCarthy | 279/134 |
| 5,044,643 | A | 9/1991 | Nakamura | 279/60 |
| 5,125,673 | A | 6/1992 | Huff et al. | 279/60 |
| 5,145,192 | A | 9/1992 | Rohm | 279/62 |
| 5,145,193 | A | 9/1992 | Rohm | 279/62 |
| 5,172,923 | A | 12/1992 | Nakamura | 279/62 |
| 5,215,317 | A | 6/1993 | Jordan | 279/63 |
| 5,232,230 | A | 8/1993 | Lin | 279/62 |
| 5,234,223 | A | 8/1993 | Sakamaki | 279/62 |
| 5,253,879 | A | 10/1993 | Huff et al. | 279/62 |
| 5,261,679 | A | 11/1993 | Nakamura | 279/62 |
| 5,286,041 | A | 2/1994 | Rohm | 279/62 |
| 5,322,303 | A | 6/1994 | Nakamura | 279/62 |
| 5,348,317 | A | 9/1994 | Steadings et al. | 279/62 |
| 5,348,318 | A | 9/1994 | Steadings et al. | 279/62 |
| 5,411,275 | A | 5/1995 | Huff et al. | 279/62 |
| 5,431,419 | A | 7/1995 | Mack | 279/62 |
| 5,458,345 | A | 10/1995 | Amyot | 279/62 |

(Continued)

FOREIGN PATENT DOCUMENTS

DE    2952220 A1    12/1979

(Continued)

*Primary Examiner*—David P Bryant
*Assistant Examiner*—Eric A. Gates
(74) *Attorney, Agent, or Firm*—Nelson Mullins Riley & Scarborough, LLP

(57) ABSTRACT

A chuck for use with a driver having a drive shaft includes a cylindrical body having a nose section and a tail section. The tail section is configured to receive the drive shaft and the nose section includes an axial bore. A plurality of jaws is movably disposed with respect to the body in communication with the axial bore. A sleeve is rotatably mounted about the body in operative communication with the jaws. A first ring is adjacent the sleeve, a second ring is adjacent the body, and one of the first ring and the second ring defines a ratchet and the other defines a pawl biased away from the ratchet. The ratchet and the first pawl are configured so that when the first pawl engages the ratchet, the ratchet and first pawl prevent the first ring from rotating in an opening direction with respect to the second ring.

11 Claims, 7 Drawing Sheets

U.S. PATENT DOCUMENTS

| | | | |
|---|---|---|---|
| 5,499,829 A | 3/1996 | Rohm | 279/62 |
| 5,499,830 A | 3/1996 | Schnizler | 279/62 |
| 5,501,473 A | 3/1996 | Barton et al. | 279/62 |
| 5,580,197 A | 12/1996 | Rohm | 408/240 |
| 5,590,985 A | 1/1997 | Mack | 408/56 |
| 5,615,899 A | 4/1997 | Sakamaki | 279/62 |
| 5,624,125 A | 4/1997 | Rohm | 279/62 |
| 5,741,016 A | 4/1998 | Barton et al. | 279/62 |
| 5,765,839 A | 6/1998 | Rohm | 279/62 |
| 5,775,704 A | 7/1998 | Wilson et al. | 279/62 |
| 5,816,582 A | 10/1998 | Steadings et al. | 279/62 |
| 5,816,583 A | 10/1998 | Middleton | 279/62 |
| 5,829,761 A | 11/1998 | Rohm | 279/62 |
| 5,882,153 A | 3/1999 | Mack et al. | 408/240 |
| 5,913,524 A | 6/1999 | Barton | 279/62 |
| 5,957,469 A | 9/1999 | Miles et al. | 279/62 |
| 5,988,958 A | 11/1999 | Mack | 408/240 |
| 6,070,884 A | 6/2000 | Mack | 279/62 |
| 6,095,530 A | 8/2000 | Rohm | 279/62 |
| 6,129,363 A | 10/2000 | Mack | 279/62 |
| 6,260,856 B1 | 7/2001 | Temple-Wilson | 279/62 |
| 6,341,783 B1 | 1/2002 | Rohm | 279/62 |
| 6,390,481 B1* | 5/2002 | Nakamuro | 279/62 |
| 6,502,836 B1* | 1/2003 | Marriott | 279/61 |
| 6,550,785 B2 | 4/2003 | Rohm | 279/62 |
| 6,554,289 B1* | 4/2003 | Lin | 279/62 |
| 6,575,478 B2 | 6/2003 | Rohm et al. | 279/62 |
| 6,581,942 B2 | 6/2003 | Rohm | 279/62 |
| 6,659,474 B2* | 12/2003 | Sakamaki et al. | 279/62 |
| 6,824,141 B1* | 11/2004 | Sakamaki et al. | 279/62 |
| 6,843,485 B2* | 1/2005 | Sakamaki et al. | 279/62 |
| 6,848,691 B2 | 2/2005 | Yang et al. | 279/62 |
| 6,860,488 B2 | 3/2005 | Mack | 279/62 |
| 6,902,171 B2* | 6/2005 | Sakamaki et al. | 279/62 |
| 7,185,895 B2* | 3/2007 | Cachod et al. | 279/62 |
| 7,296,803 B2* | 11/2007 | Yang et al. | 279/62 |
| 2002/0000698 A1* | 1/2002 | Rohm | 279/62 |
| 2003/0026670 A1* | 2/2003 | Temple-Wilson | 408/240 |
| 2003/0042692 A1* | 3/2003 | Sakamaki et al. | 279/62 |
| 2003/0071425 A1* | 4/2003 | Lin | 279/62 |
| 2003/0137113 A1* | 7/2003 | Sakamaki et al. | 279/62 |
| 2003/0141676 A1* | 7/2003 | Sakamaki et al. | 279/62 |
| 2004/0217558 A1 | 11/2004 | Yang et al. | |
| 2005/0087937 A1* | 4/2005 | Zhou | 279/62 |
| 2005/0230926 A1* | 10/2005 | Sakamaki et al. | 279/62 |
| 2005/0242531 A1* | 11/2005 | Young | 279/62 |
| 2005/0258605 A1* | 11/2005 | Tan | 279/62 |
| 2006/0038359 A1* | 2/2006 | Luckenbaugh et al. | 279/62 |
| 2006/0279048 A1* | 12/2006 | Gong et al. | 279/62 |

FOREIGN PATENT DOCUMENTS

| | | |
|---|---|---|
| DE | 4238503 C1 | 11/1992 |
| DE | 4438991 A1 | 10/1994 |
| DE | 19506708 C1 | 2/1995 |
| DE | 29600727 U1 | 1/1996 |
| EP | 0710518 A2 | 5/1996 |
| EP | 0710519 A2 | 5/1996 |
| EP | 0519412 B1 | 3/1997 |
| EP | 0618029 B1 | 6/1997 |
| EP | 0677348 B1 | 8/1997 |
| EP | 0785041 B1 | 2/2001 |
| EP | 0710520 B1 | 7/2001 |
| EP | 1055472 B1 | 9/2001 |
| EP | 1043100 B1 | 7/2002 |
| EP | 1224993 B1 | 7/2004 |
| FR | 2645056 | 3/1989 |
| GB | 2356367 A | 5/2001 |
| GB | 2361201 A | 10/2001 |
| GB | 2389809 A | 12/2003 |
| JP | 4365504 | 12/1992 |

* cited by examiner

LOCKING CHUCK

FIELD OF THE INVENTION

The present invention relates generally to chucks for use with drills or with electric or pneumatic power drivers. More particularly, the present invention relates to a chuck of the keyless type which may be tightened or loosened by hand or actuation of the driver motor.

BACKGROUND OF THE INVENTION

Both hand and electric or pneumatic tool drivers are well known. Although twist drills are the most common tools on such drivers, the tools may also comprise screw drivers, nut drivers, burrs, mounted grinding stones, and other cutting or abrading tools. Since the tool shanks may be of varying diameter or of polygonal cross section, the device is usually provided with a chuck adjustable over a relatively wide range. The chuck may be attached to the driver by a threaded or tapered bore.

A variety of chucks have been developed in the art. In an oblique jawed chuck, a chuck body includes three passageways disposed approximately 120° apart from each other. The passageways are configured so that their center lines meet at a point along the chuck axis forward of the chuck. The passageways constrain three jaws which are moveable in the passageways to grip a cylindrical or polygonal tool shank displaced approximately along the chuck center axis. The chuck includes a nut that rotates about the chuck center and that engages threads on the jaws so that rotation of the nut moves the jaws in either direction within the passageways. The body is attached to the drive shaft of a driver and is configured so that rotation of the body in one direction with respect to the nut forces the jaws into gripping relationship with the tool shank, while rotation in the opposite direction releases the gripping relationship. The chuck may be keyless if it is rotated by hand. Various configurations of keyless chucks are known in the art and are desirable for a variety of applications.

SUMMARY OF THE INVENTION

The present invention recognizes and addresses the foregoing considerations, and others, of prior art constructions and methods. One embodiment of the present invention includes a chuck for releasably attaching a tool with a shank to a manual or powered driver having a rotatable drive shaft. The chuck includes a generally cylindrical body having a nose section and a tail section, the tail section is configured to receive the drive shaft and the nose section has an axial bore formed therein. A plurality of jaws is movably disposed with respect to the body in communication with the axial bore. A sleeve is rotatably mounted about the body in operative communication with the jaws so that rotation of the sleeve in a closing direction moves the jaws toward the axis of the axial bore and rotation of the sleeve in an opening direction moves the jaws away from the axis. A first ring is adjacent the sleeve, a second ring is adjacent the body, and one of the first ring and the second ring defines a ratchet and the other of the first ring and the second ring defines a pawl biased away from the ratchet. The ratchet and the first pawl are configured so that when the first pawl engages the ratchet, the ratchet and first pawl prevent the first ring from rotating in the opening direction with respect to the second ring.

Another embodiment includes a chuck for releasably attaching a tool with a shank to a manual or powered driver having a rotatable drive shaft. The chuck includes a generally cylindrical body having a nose section and a tail section, the tail section is configured to rotate with the drive shaft and the nose section has an axial bore formed therein and a plurality of passageways formed therethrough and intersecting the axial bore. A plurality of jaws is movably disposed in the passageways and a generally cylindrical sleeve is rotatably mounted about the body. A nut is rotatably mounted about the body and in operative communication with the jaws so that rotation of the nut in a closing direction moves the jaws toward the axis of the axial bore and rotation of the nut in an opening direction moves the jaws away from the axis. A first ring is adjacent the nut, a second ring is adjacent the body, and the second ring defines a ratchet and the first ring defines a deflectable first pawl biased away from the ratchet. The ratchet and the first pawl are configured so that when the first pawl engages the ratchet, the ratchet and first pawl permit the first ring to rotate in the closing direction with respect to the second ring but prevent the first ring from rotating in the opening direction with respect to the second ring. The sleeve is in operative communication with the nut so that the sleeve rotationally drives the nut but is rotatable with respect to the nut between a first rotational position and a second rotational position. The sleeve defines a cam surface disposed with respect to the first pawl so that the cam surface engages the first pawl with the ratchet when the sleeve is in the second position with respect to the nut and releases the first pawl to disengage the ratchet when the sleeve is in the first position with respect to the nut.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying figures, in which.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
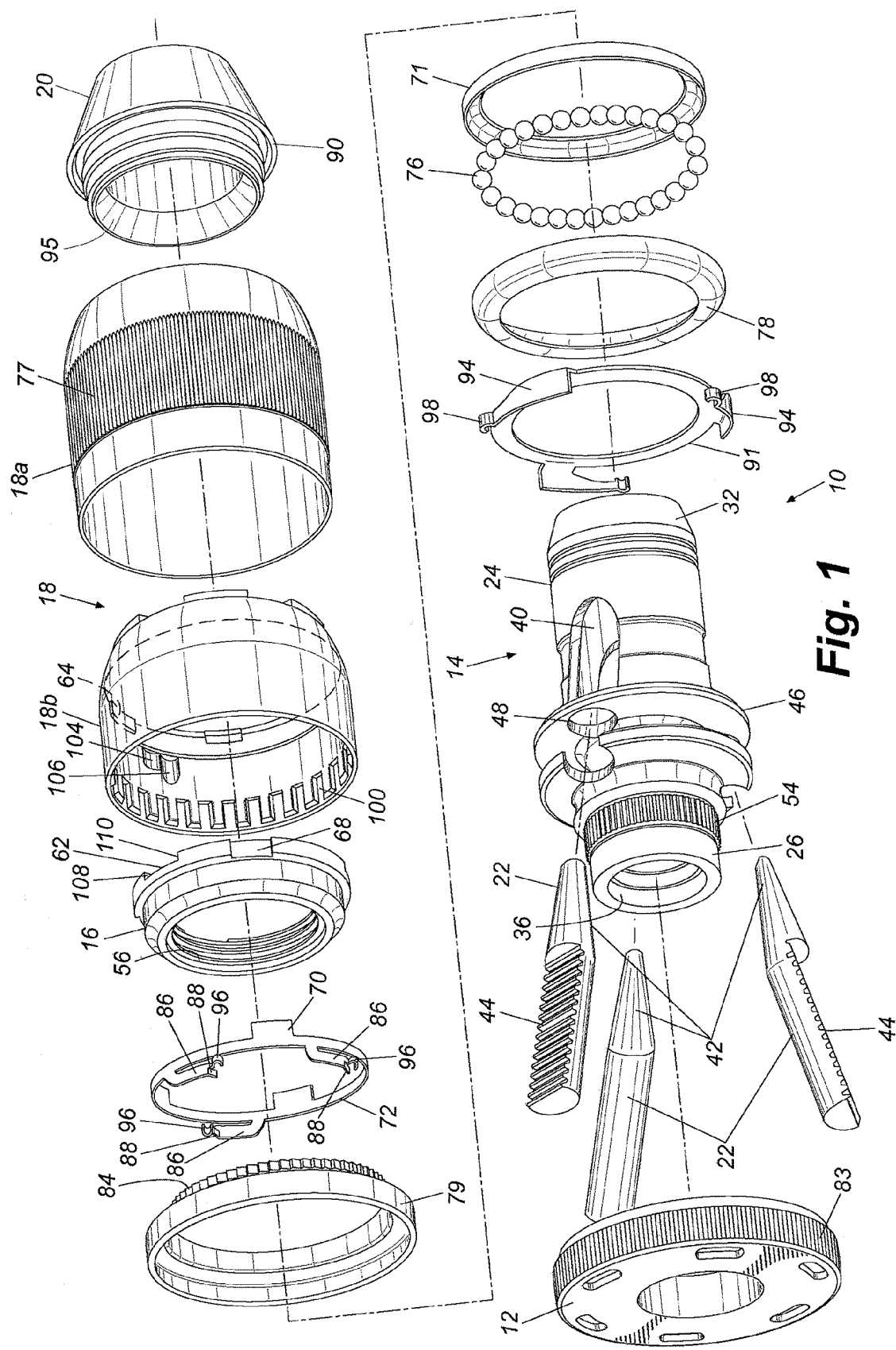
FIG. 1 is an exploded view of a drill chuck in accordance with an embodiment of the present invention.
Figure 2:
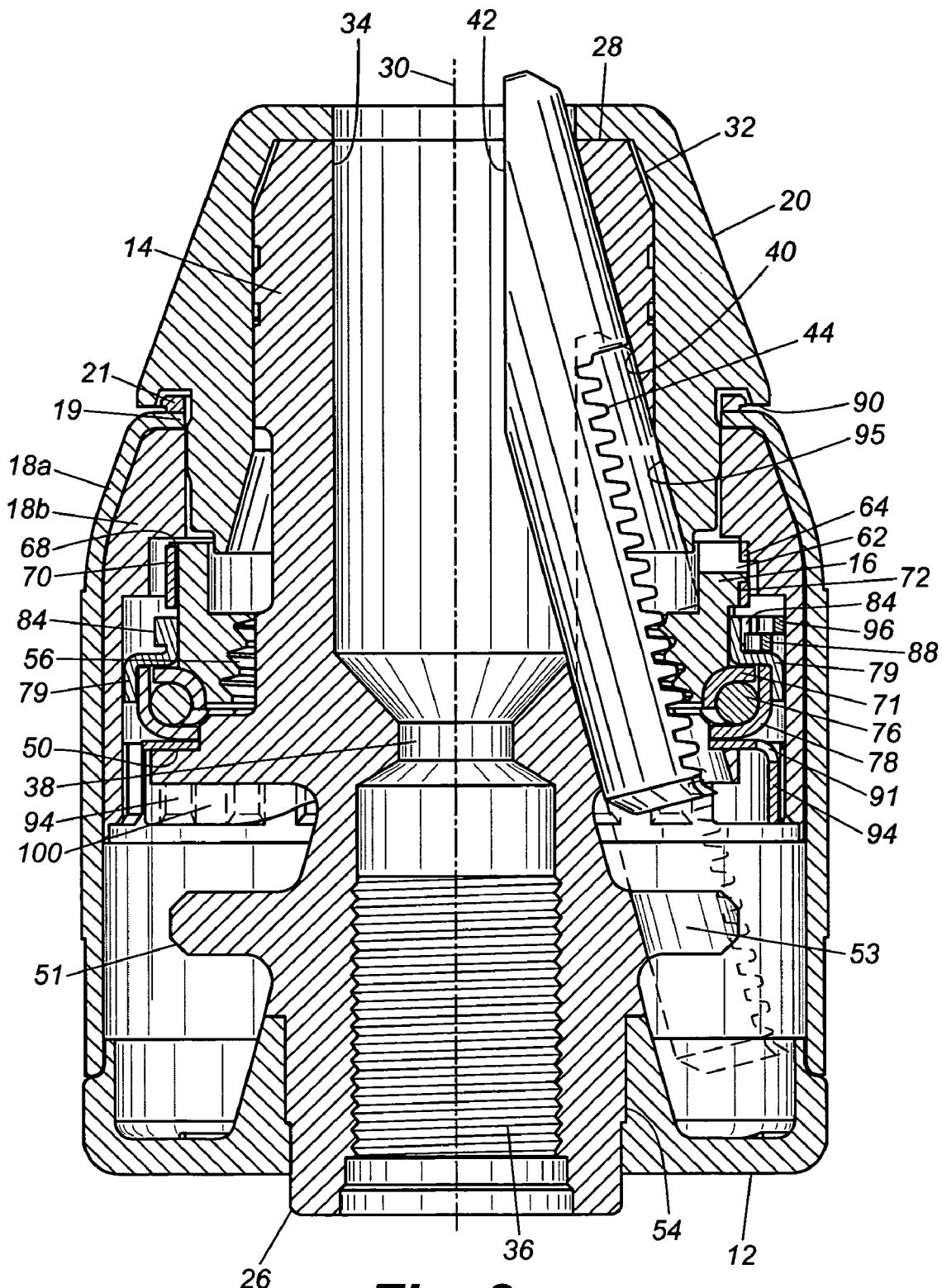
FIG. 2 is a longitudinal view, in cross section, of the drill chuck as shown in FIG. 1.

Referring to FIGS. 1 and 2, a chuck 10 includes a body 14, a nut 16, a front sleeve 18, a nose piece 20 and a plurality of jaws 22. Body 14 is generally cylindrical in shape and comprises a nose or forward section 24 and a tail or rearward section 26. Nose section 24 has a front face 28 transverse to the longitudinal center axis 30 of body 14 and a tapered surface 32 at its forward end. The nose section defines an axial bore 34 that is dimensioned somewhat larger than the largest tool shank that the tool is designed to accommodate. A threaded bore 36 is formed in tail section 26 and is of a standard size to mate with the drive shaft of a powered or hand driver (not shown). The bores 34, 36 may communicate at a central region 38 of body 14. While a threaded bore 36 is illustrated, such bore could be replaced with a tapered bore of a standard size to mate with a tapered drive shaft. Furthermore, body 14 may be formed integrally with the drive shaft.

Body 14 defines three passageways 40 to accommodate three jaws 22. Each jaw is separated from the adjacent jaw by an arc of approximately 120°. The axes of passageways 40 and jaws 22 are angled with respect to the chuck center axis 30 such that each passageway axis travels through axial bore 34 and intersects axis 30 at a common point ahead of the chuck body. The jaws form a grip that moves radially toward and away from the chuck axis to grip a tool, and each jaw 22 has a tool engaging face 42 generally parallel to the axis of chuck body 14. Threads 44, formed on the opposite or outer surface of each jaw 22, may be constructed in any suitable type and pitch.

As illustrated in FIGS. 1 and 2, body 14 includes a thrust ring 46 that, in a preferred embodiment, may be integral with the body. It should be understood, however, that thrust ring 46 and body 14 may be separate components. Thrust ring 46 includes a plurality of jaw guideways 48 formed around its circumference to permit retraction of jaws 22 therethrough and also includes a ledge portion 50 to receive a bearing assembly as described below.

Body tail section 26 includes a knurled surface 54 that receives an optional rear sleeve 12 in a press fit. Rear sleeve 12 could also be retained by press fit without knurling, by use of a key or by crimping, staking, riveting, threading or any other suitable securing mechanism. Further, the chuck may be constructed with a single sleeve having no rear sleeve.

Nose piece 20 retains nut 16 against forward axial movement. The nose piece is press fit to body nose section 24. It should be understood, however, that other methods of axially securing the nut on the body may be used. For example, the nut may be a two-piece nut held on the body within a circumferential groove on the outer circumference of the body. Nose piece 20 may be coated with a non-ferrous metallic coating to prevent rust and to enhance its appearance. Examples of suitable coatings include zinc or nickel, although it should be appreciated that any suitable coating could be utilized.

Front sleeve 18 includes outer sleeve 18a and inner sleeve 18b. The outer circumferential surface of outer sleeve 1 8a may be knurled or may be provided with longitudinal ribs 77 or other protrusions to enable the operator to grip it securely. In like manner, the circumferential surface of rear sleeve 12, if employed, may be knurled or ribbed as at 83 if desired.

Front sleeve 18 is secured from movement in the forward axial direction by an annular shoulder 90 on nose piece 20. A frustoconical inner section 95 at the rearward end of the nose piece facilitates movement of jaws 22 within the chuck.

Inner sleeve 18b of front sleeve 18 and rear sleeve 12 may be molded or otherwise fabricated from a structural plastic such as polycarbonate, a filled polypropylene, for example a glass filled polypropylene, or a blend of structural plastic materials. Other composite materials such as, for example, graphite filled polymerics may also be suitable in certain environments. As should be appreciated by one skilled in the art, the materials for which the chuck of the present disclosure is fabricated will depend on the end use of the chuck, and the above materials are provided by way of example only. Inner sleeve 18b is received within outer sleeve 18a in a press-fit. Inner sleeve 18b also includes a plurality of equally spaced grooves 21, each of which receives an inwardly depending tab 19 of outer sleeve 18a. The width of each groove 21 is the same as that of each tab 19 so that the bond between inner and outer sleeves 18a and 18b is enhanced.

Nut 16 has threads 56 for mating with jaw threads 44. Nut 16 is positioned about the body in engagement with the jaw threads so that when the nut is rotated with respect to body 14, the jaws will be advanced or retracted depending on the rotational direction of nut 16.

Figure 3:
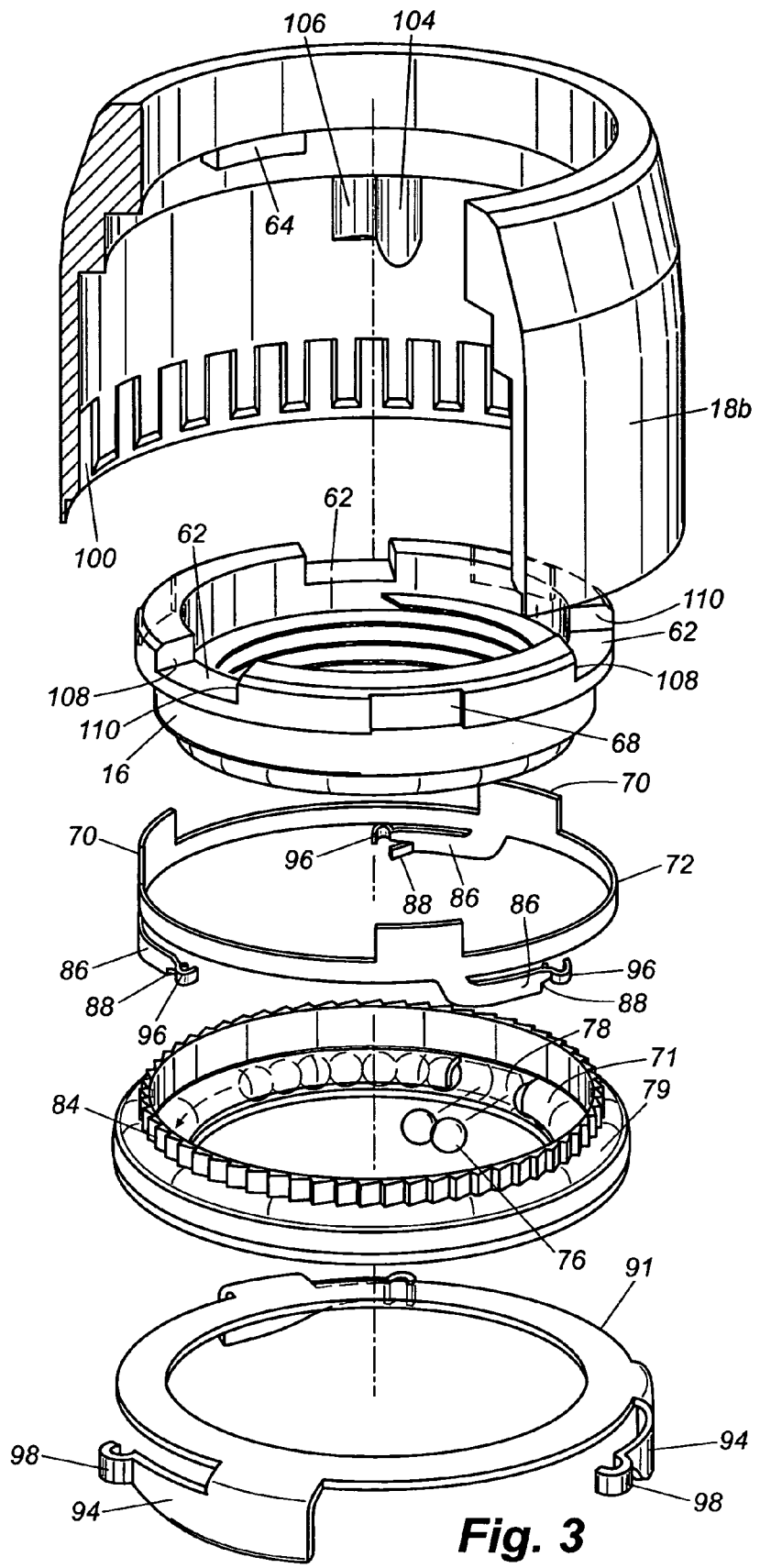
FIG. 3 is an exploded view of the bearing, nut, and sleeve of the chuck as shown in FIG. 1.

As illustrated in FIG. 3, the forward axial face of nut 16 includes recesses 62 that receive respective drive dogs 64 (FIG. 1) extending from the inner surface of inner sleeve 18b. The angular width of the drive dogs is less than that of the recesses, resulting in a slight range of relative rotational movement, for example between 6° and 10°, between the nut and the front sleeve.

Nut 16 also defines a plurality of grooves formed as flats 68 about the outer circumference of the nut. Flats 68 receive respective tabs 70 extending forward from a first ring 72. The engagement of tabs 70 and flats 68 rotationally fix the first ring to the nut, although it should be understood that there may be a slight rotational tolerance between the two. The operation of the first ring is discussed in greater detail hereafter.

A bearing assembly is disposed between nut 16 and the chuck body. Nut 16 rests on an inner race 71 of the bearing assembly. Inner race 71 receives a plurality of bearing elements, in this case bearing balls, 76 disposed between it and a second ring 78 (or outer race of the bearing assembly) supported to the rear by thrust ring ledge 50 (FIG. 2). Outer race 78 freely rotates about body 14 until it becomes frictionally fixed by rearward force during the loading of tools into the chuck, as discussed in greater detail hereafter.

Outer race 78 also includes a ratchet in the form of an annular ratchet ring 79 which is press fit onto outer race 78. In the illustrated embodiment, the ratchet is formed by a plurality of sawtooth-shaped teeth 84 disposed about an outer circumferential surface of the ratchet ring. A first pawl 86 extends from one side of each tab 70 and is biased radially outward from the first ring, thereby urging a distal end 88 of each first pawl 86 away from the annular array of teeth 84 on the ratchet ring.

Figure 4:
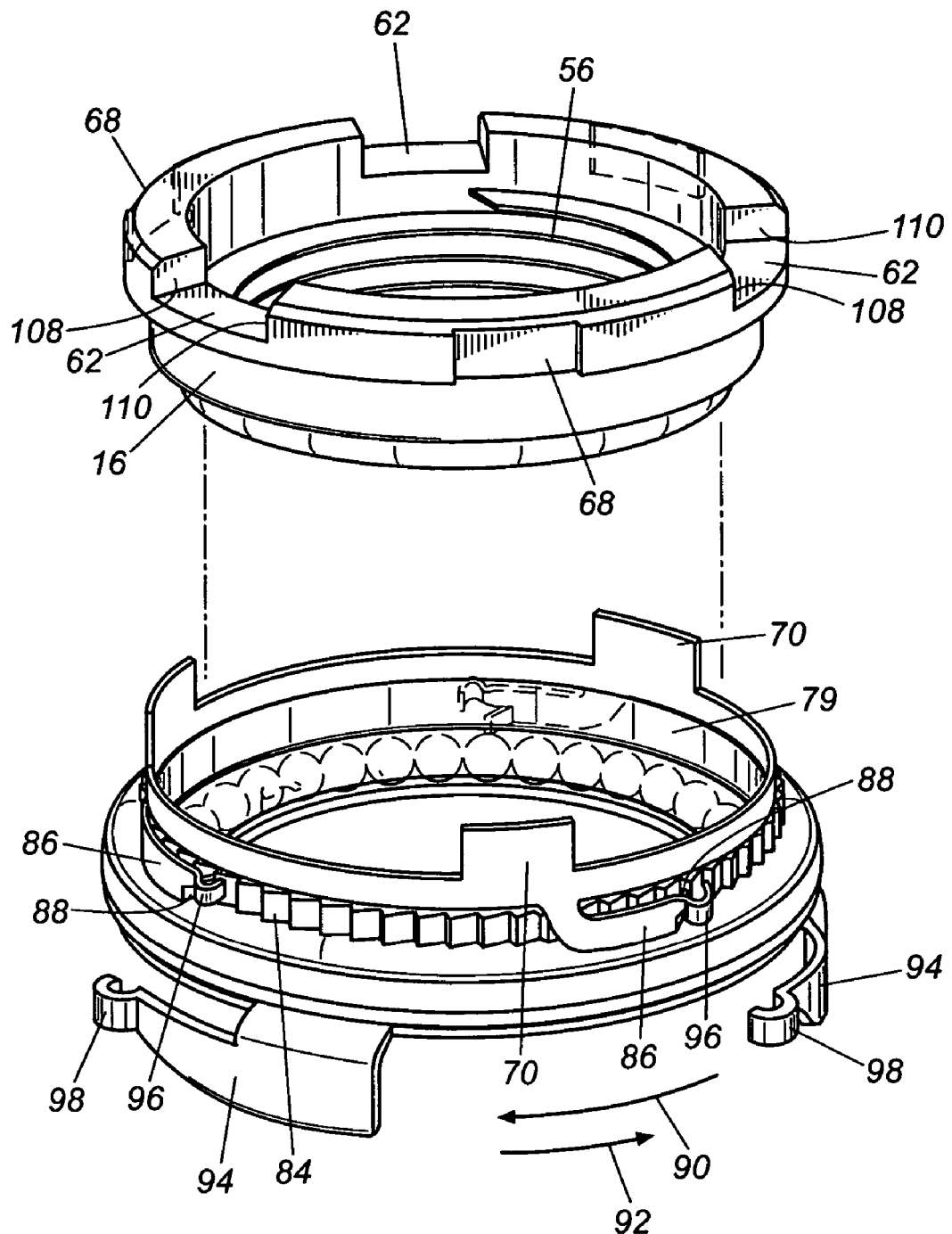
FIG. 4 is an exploded view of the bearing and nut of the drill chuck as shown in FIG. 1.

Referring now to FIG. 4, each tooth 84 has a first side with a slope approaching 90°. The second side has a lesser slope. First pawl 86 is deflectable and is generally disposed in alignment with the slope of the second side. Thus, rotation of first ring 72 in a direction 90 (closing direction) with respect to outer race 78, once outer race 78 has become non-rotatably fixed to the chuck body by rearward force, moves distal ends 88 repeatedly over teeth 84, causing a clicking sound as they fall against each subsequent second side of each tooth 84. This configuration of teeth 84 and first pawls 86, however, prevents the rotation of first ring 72 in an opposite direction 92

(opening direction) once outer race 78 has become non-rotatably fixed to the chuck body. Application of rotational force to the inner race in this direction forces distal ends 88 into the steep-sloped first sides of teeth 84. Since distal ends 88 of first pawls 86 are generally perpendicular to the first sides, the first pawls 86 do not deflect to permit rotation.

As discussed below, direction 90 corresponds to the closing direction of the chuck, while direction 92 corresponds to the opening direction of the chuck. Accordingly, when first pawls 86 engage ratchet teeth 84, the teeth permit movement of first ring 72 in the closing direction of the chuck but prevent movement of first ring 72 in the opening direction.

A third ring 91 is disposed between the bearing assembly and thrust ring 46 of the chuck body. A second pawl 94 extends circumferentially about third ring 91 and selectively engages inner sleeve 18b. Third ring 91 is freely rotatable about the chuck body until sufficient rearward force is exerted thereon such that third ring 91 becomes frictionally fixed to the thrust ring, as discussed in greater detail hereafter.

First and second pawls 86 and 94 include biasing tabs 96 and 98 at their distal ends. An inner circumferential surface of inner sleeve 18b defines a plurality of equally spaced recesses 100. During operation of drill chuck 10, each biasing tab 98 is received in one of these recesses. Inner sleeve 18b also defines a second recess 104 and a cam surface 106. Depending on the rotational position of front sleeve 18 with respect to first ring 72 and nut 16, each biasing tab 96 is received either by cam surface 106 or by second recess 104. The inner sleeve includes a second recess 104 and cam surface 106 for each tab 96.

Figure 6A:
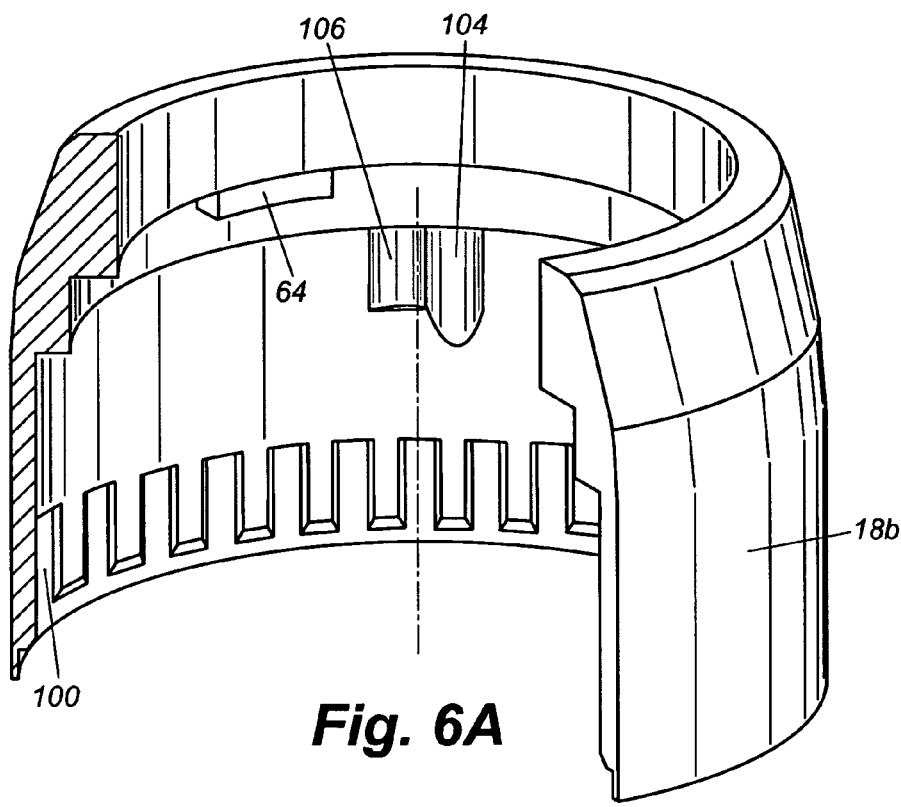
FIGS. 6A-6C are partial cross sectional views of the click ring and sleeve of the chuck as shown in FIG. 1; and Repeat use of reference characters in the present specification and drawings is intended to represent same or analogous features or elements of the drill chuck.
Figure 6B:
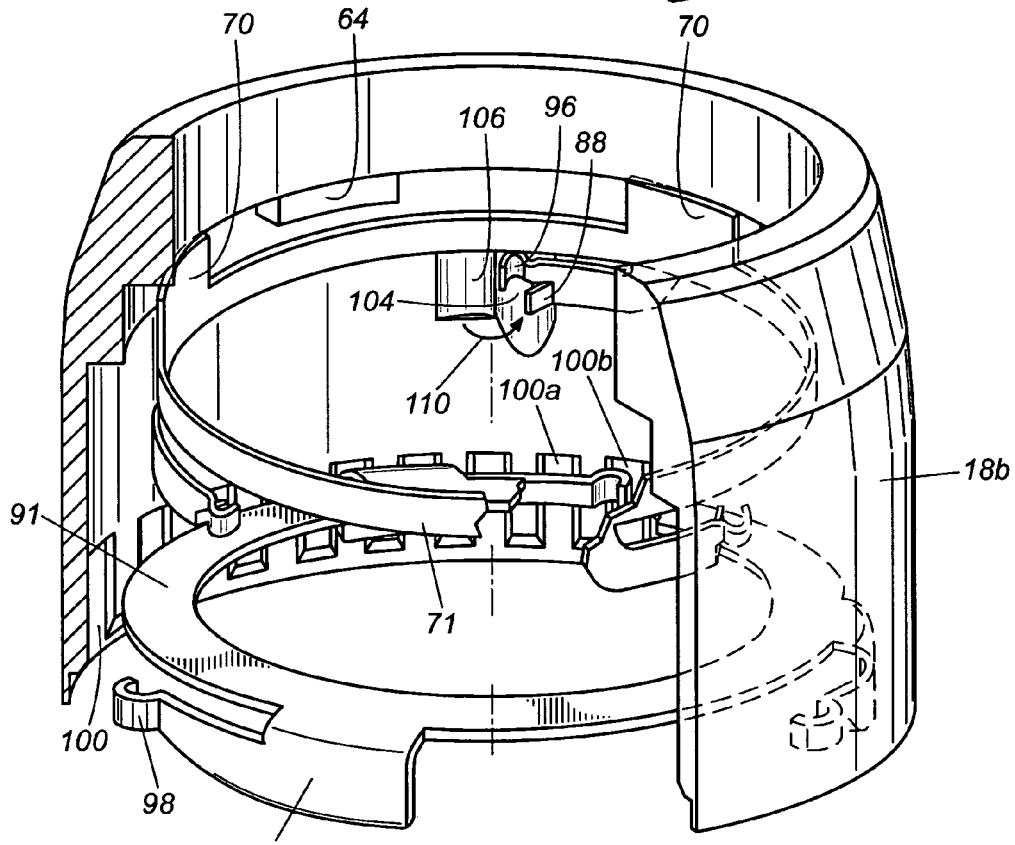
Figure 6C:
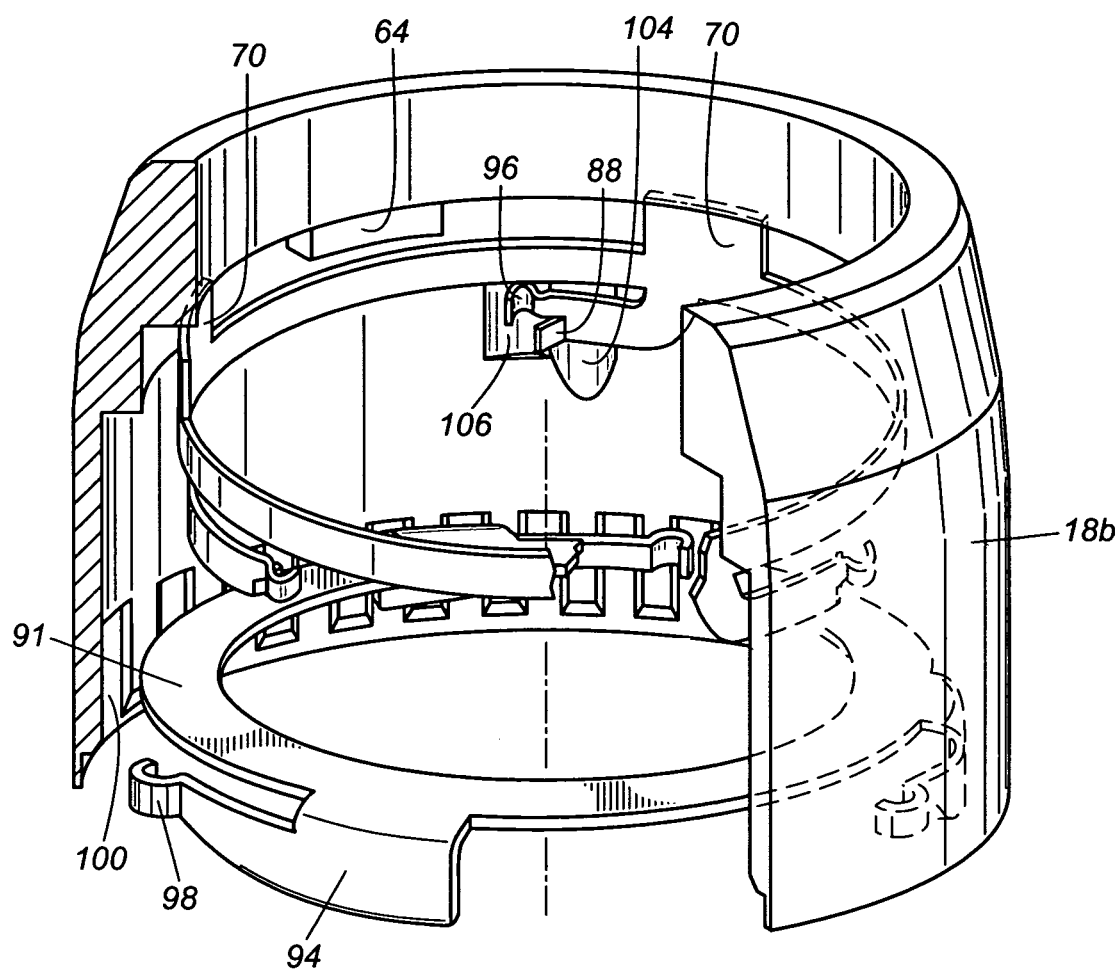

FIG. 6B illustrates the disposition of first pawls 86 and second pawls 94 when front sleeve 18 is in a first of two positions with respect to nut 16, while FIG. 6C illustrates these components when the front sleeve is in a second position with respect to the nut. For ease of illustration, both figures omit the nut. However, referring to FIGS. 3 and 6C, each drive dog 64 is disposed against or adjacent to a side 108 of the gap 62 in which is it received when sleeve 18 is in the second position with respect to the nut. Each biasing tab 98 of each second pawl 94 is received in a recess 100a, and each biasing tab 96 of each first pawl 86 is positioned on a respective cam surface 106. Accordingly, distal end 88 of each first pawl 86 is forced inwardly and engages ratchet teeth 84, and first ring 72 can rotate only in direction 90 with respect to outer race 78.

Figure 5:
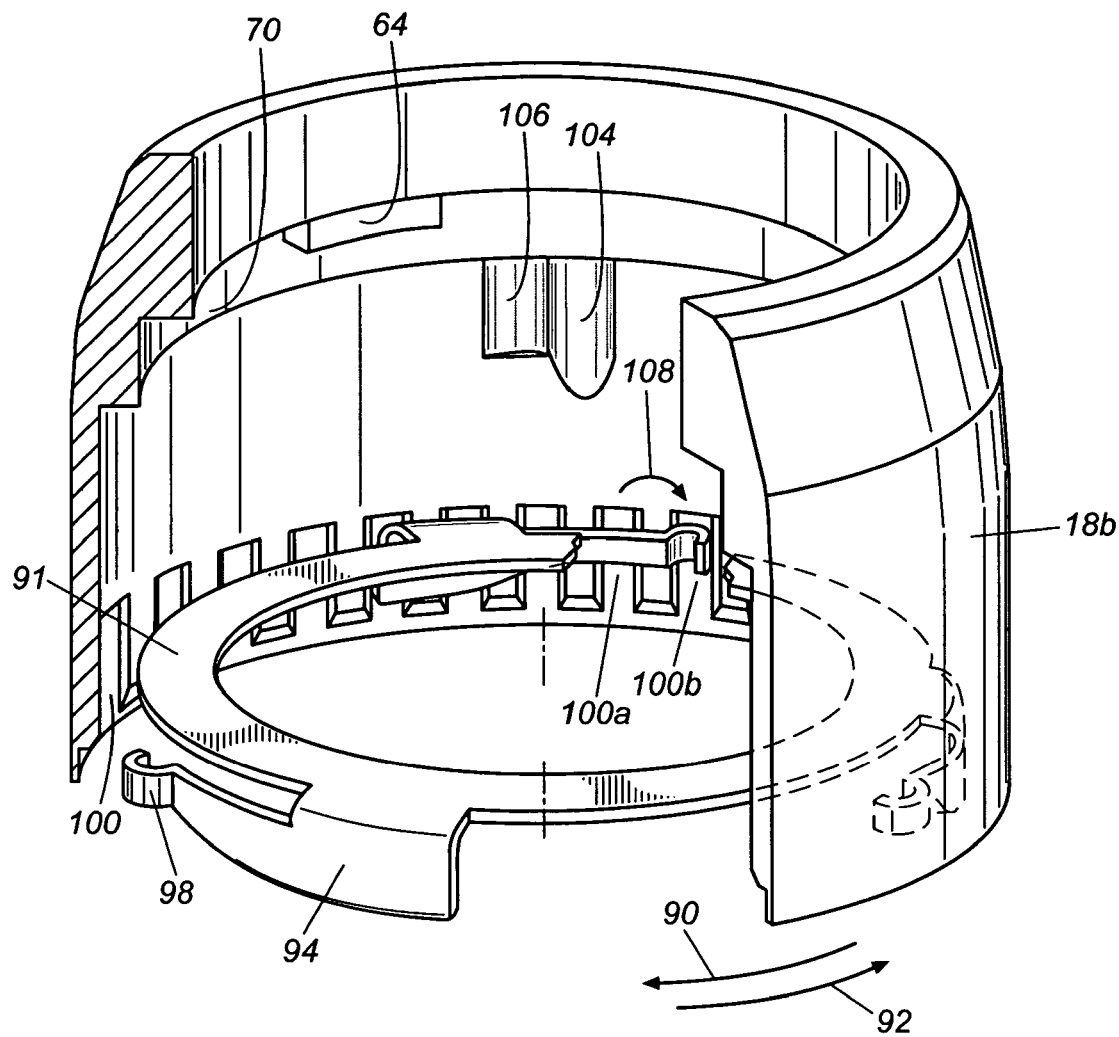
FIG. 5 is a partial perspective view of the lock ring and sleeve of the drill chuck as shown in FIG. 1.

Referring now to FIGS. 5 and 6B, when sleeve 18 moves in opening direction 92 with respect to the outer race, each biasing tab 98 moves out of the initial recess 100a and into an adjacent recess 100b, as indicated by arrow 108. Each biasing tab 96 rides off of respective cam surface 106 and into recess 104, as indicated by arrow 110. This allows each deflectable first pawl 86 to return to its normal, outwardly biased position, thereby disengaging distal ends 88 of first pawls 86 from ratchet teeth 84. Thus, first ring 72 is free to rotate with respect to chuck body 12. Continued rotation of sleeve 18 in opening direction 92 eventually causes the rotation of nut 16 in the opening direction, thereby releasing the rearward axial force exerted on outer race 78. As such, outer race 78 is also free to rotate with respect to chuck body 12 since rearward axial force no longer frictionally locks outer race 78 to the chuck body.

As described in more detail below, when front sleeve 18 rotates in direction 92 so that the first and third rings move from the positions shown in FIG. 6C to the position shown in FIG. 6B, drive dogs 64 move within grooves 62 of nut 16 (FIG. 1) SO that each drive dog is against or immediately adjacent to a side 110 of the groove.

In operation, and referring to FIGS. 1, 4, 6B and 6C, nut grooves 62 receive drive dogs 64 when the chuck is between fully opened and fully closed positions so that the drive dogs are adjacent groove sides 110. First ring 72 is disposed with respect to outer race 78 so that biasing tabs 96 are received by respective second recesses 104. That is, front sleeve 18 is in the first position with respect to the nut. As in both the first and second positions, biasing tabs 98 are received in respective recesses 100. In this condition, biasing tabs 96 and second recesses 104 rotationally fix first ring 72 to front sleeve 18. Since first ring 72 is rotationally fixed to nut 16 by tabs 70 and flats 68, an operator rotating front sleeve 18 rotationally drives the nut through first ring 72, thereby opening or closing the jaws. When the operator rotates the sleeve/lock ring/nut in the closing direction (indicated by arrow 90) to the point that the jaws tighten onto a tool shank, the nut is urged rearward up the jaw threads, thereby pushing the nut against inner race 72, bearing elements 76, outer race 78, third ring 91, and thrust ring 46.

The wedge between the nut threads and jaw threads increasingly resists the rotation of the nut. When the operator continues to rotate front sleeve 18 in closing direction 90, and the resistance overcomes the hold provided by biasing tabs 96 in second recesses 104, front sleeve 18 rotates with respect to nut 16 and first ring 72. This moves drive dogs 64 from sides 110 of grooves 62 to sides 108 and pushes biasing tabs 98 out of recesses 100b into recesses 100a (FIGS. 6B and 6C). Simultaneously, cam surfaces 106 rotate toward biasing tabs 96 so that the biasing tabs leave their respective second recesses 104 and ride up on the cam surfaces, thereby biasing first pawls 86 inwardly such that distal ends 88 of the pawls engage ratchet teeth 84 of ratchet ring 79, as shown in FIG. 6C. At this point, first ring 72, and therefore nut 16, is rotationally locked to outer race 78, and therefore chuck body 14, against rotation in opening direction 92 of the chuck. That is, the nut is rotationally locked to the chuck body in the opening direction. Since the rotation of the nut with respect to the body is necessary to open the chuck, this resists inadvertent opening during use.

First ring 72, and therefore nut 16, may, however, still rotate with respect to outer race 78, and therefore body 14, in the closing direction 90 of the chuck. When the user rotates sleeve 18, the sleeve drives nut 16 through drive dogs 64 against groove sides 108, as well as through first ring 72. This continues to tighten the chuck and, as described above, produces a clicking sound to notify the operator that the chuck is in a fully tightened position.

To open the chuck, the operator rotates front sleeve 18 in opening direction 92. Front sleeve 18 transfers this torque to first ring 72 at the engagement of biasing tabs 96 on cam surfaces 106 and to third ring 91 at the engagement of biasing tabs 98 in recesses 100. Because first pawls 86 engage ratchet ring 79, which is rotationally fixed to the body via outer race 78, through the ratchet teeth, first ring 72 cannot rotate with the front sleeve. Thus, upon application of sufficient torque in the opening direction 92, front sleeve 18 moves with respect to the first ring and the nut. This moves first tabs 96 off of cam surfaces 106 and back into second recesses 104, thereby disengaging distal ends 88 of respective first pawls 86 from ratchet teeth 84. Biasing tabs 98 move from recesses 100a into recesses 100b (FIG. 5), and drive dogs 64 move from sides 108 to sides 110 of grooves 62. Thus, the front sleeve moves to the first position with respect to the nut, as shown in FIG. 6B, and the first ring and nut are free to rotate with respect to the outer race and chuck body. Accordingly, further rotation of front sleeve 18 in the opening direction moves jaws 22 away from the chuck axis, thereby opening the chuck.

It should be understood that the embodiment illustrated in the figures is provided by way of explanation only and that the present invention may be realized in any suitable form. For example, the pawls and ratchet may be formed in any suitable configuration. The present invention may be used in a variety of configurations whereby a bearing having a ratchet configuration is disposed between a sleeve, for example a nut or other suitable configuration, and the chuck body.

While one or more preferred embodiments of the present invention have been described above, it should be understood that any and all equivalent realizations of the present invention are included within the scope and spirit thereof. Thus, The depicted embodiment(s) are presented by way of example only and are not intended as limitations on the present invention. It should be understood that aspects of the various one or more embodiments may be interchanged both in whole or in part. Therefore, it is contemplated that any and all such embodiments are included in the present invention as may fall within the literal or equivalent scope of the appended claims.

What is claimed is:

1. A chuck for releasably attaching a tool with a shank to a manual or powered driver having a rotatable drive shaft, said chuck comprising:
   a generally cylindrical body having a nose section and a tail section, said tail section being configured to receive the drive shaft and said nose section having an axial bore formed therein and a plurality of passageways formed therethrough and intersecting said axial bore;
   a plurality of jaws movably disposed in said passageways;
   a generally cylindrical sleeve rotatably mounted about said body;
   a nut rotatably mounted about said body and in operative communication with said jaws so that rotation of said nut in a closing direction moves said jaws toward an axis of said axial bore and rotation of said nut in an opening direction moves said jaws away from said axis;
   a first ring adjacent said nut, a second ring adjacent said body, wherein said second ring defines a ratchet, wherein said first ring is rotationally fixed to said nut and defines a deflectable first pawl biased away from said ratchet and wherein said ratchet and said first pawl are configured so that when said first pawl engages said ratchet, said ratchet and first pawl permit said first ring to rotate in said closing direction with respect to said second ring but prevent said first ring from rotating in said opening direction with respect to said second ring; and
   a third ring, wherein said third ring includes a second deflectable pawl, wherein said second pawl is biased toward an inner circumferential surface of said sleeve and wherein said inner circumferential surface defines at least two recesses disposed with respect to said third ring,
   wherein said sleeve is in operative communication with said nut so that said sleeve rotationally drives said nut through said second ring but is rotatable with respect to said nut between a first rotational position and a second rotational position,
   wherein said sleeve defines a cam surface disposed with respect to said first pawl so that said cam surface engages said first pawl with said ratchet when said sleeve is in said second position with respect to said nut and releases said first pawl to disengage said ratchet when said sleeve is in said first position with respect to said nut, and
   wherein said second pawl is received by a first said recess when said sleeve is in said first position and so that said second pawl is received by a second said recess when said sleeve is in said second position.

2. The chuck as in claim 1, wherein said second ring is rotationally fixed with respect to said body when said sleeve is in said second position.

3. The chuck as in claim 1, wherein said first ring includes a tab extending therefrom into a corresponding groove in said nut.

4. The chuck as in claim 1, wherein said inner circumferential surface defines said cam surface and defines a third recess disposed adjacent said cam surface and with respect to said first pawl so that said first pawl engages said cam surface when said sleeve is in said second position and so that said first pawl is received by said third recess when said sleeve is in said first position.

5. The chuck of claim 1, wherein said at least two recesses further comprise a plurality of equally spaced recesses.

6. The chuck as in claim 1, wherein an inner circumferential surface of said sleeve defines said cam surface and defines a recess disposed adjacent said cam surface and with respect to said first pawl so that said first pawl engages said cam surface when said sleeve is in said second position and so that said first pawl is received by said recess when said sleeve is in said first position.

7. The chuck as in claim 1, including a plurality of said first pawls and a corresponding plurality of said cam surfaces.

8. The chuck as in claim 1, further comprising a bearing assembly disposed between said nut and said body, said bearing assembly including a front race and a rear race rotatably mounted about said body, and wherein said rear race is said second ring.

9. A chuck for releasably attaching a tool with a shank to a powered driver having a rotatable drive shaft, said chuck comprising:
   a generally cylindrical body having a nose section and a tail section, said tail section being configured to rotate with said drive shaft and said nose section having an axial bore formed therein and a plurality of passageways formed therethrough and intersecting said axial bore;
   a plurality of jaws movably disposed in said passageways;
   a generally cylindrical sleeve rotatably mounted about said body;
   a nut rotatably mounted about said body and in operative communication with said jaws so that rotation of said nut in a closing direction moves said jaws toward the axis of said axial bore and rotation of said nut in an opening direction moves said jaws away from said axis; and
   a bearing having a first race, a second race rotational about said body and a plurality of bearing elements disposed between said first race and said second race, wherein said second race defines a ratchet;
   a first ring rotationally fixed to said nut, wherein said first ring defines a deflectable first pawl biased away from said ratchet and wherein said ratchet and said first pawl are configured so that when said first pawl engages said ratchet, said ratchet and first pawl permit said first ring to rotate in said closing direction with respect to said second race but prevent said first ring from rotating in said opening direction with respect to said second race,
   wherein said sleeve is in operative communication with said nut so that said sleeve rotationally drives said nut but is rotatable with respect to said nut between a first rotational position and a second rotational position, and
   wherein said sleeve defines a cam surface disposed with respect to said first pawl so that said cam surface engages said first pawl with said ratchet when said sleeve is in said second position with respect to said nut and releases said first pawl to disengage said ratchet when said sleeve is in said first position with respect to said nut.

10. The chuck as in claim 9, further comprising a third ring, wherein said third ring includes a second deflectable pawl, wherein said second pawl is biased toward an inner circumferential surface of said sleeve and wherein said inner circumferential surface defines two recesses disposed with respect to said third ring so that said second pawl is received by a first said recess when said sleeve is in said first position and so that said second pawl is received by a second said recess when said sleeve is in said second position.

11. The chuck as in claim 10, including a plurality of said first pawls, said second pawls, said cam surfaces and said recesses.

* * * * *